Aug. 8, 1933.  J. H. ROUSE  1,921,483
PHOTO ELECTRIC CELL
Filed Nov. 25, 1930
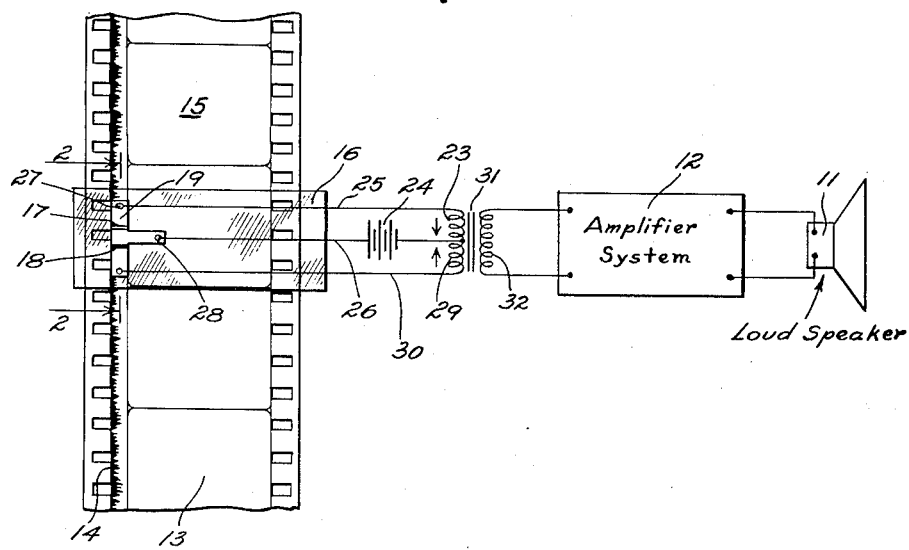
Fig. 1
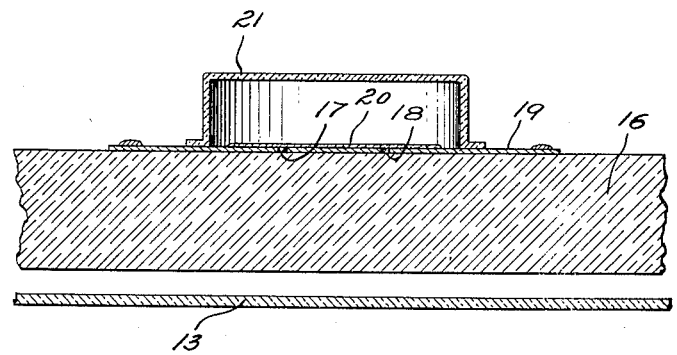
Fig. 2
Inventor
John H. Rouse
by John Flann
Attorney Patented Aug. 8, 1933

1,921,483

UNITED STATES PATENT OFFICE 1,921,483

PHOTOELECTRIC CELL

John H. Rouse, Los Angeles, Calif.

Application November 25, 1930
Serial No. 498,063

14 Claims. (Cl. 179—100.3)

This invention relates to a light sensitive cell, and especially to a cell adapted to be used for translating variations in light radiations into electric impulses.

Such a cell is especially useful for the reproduction of sound from photographic records thereof, such as are encountered in talking motion picture films.

These talking motion picture films usually carry, in addition to the "frames", a sound track in the form of a photographic record of the sound to be reproduced. This photographic record may be either a "saw tooth" record, or a variable density record, for varying the amount of light to be transmitted to the cell. Since such records are now well-known, as well as their methods of production, it is sufficient merely to note that usually a constant source of illumination is used to pass light through the sound track and onto a light sensitive cell, the amount transmitted to the cell being thus dependent upon the varying capability of the sound track to transmit this light. The light sensitive cell in turn affects an amplifier system connected to one or more loud speakers.

It has been common in connection with light systems to employ a very narrow aperture over which the record film travels so as to confine the transmission of the light through a very small element or width of the sound track at any instant; and in most instances a lens system is also used to focus the light passing through the film onto the light sensitive cell.

It is one of the objects of my invention to provide a novel type of light sensitive cell which obviates the necessity of a slit, but which nevertheless causes the light sensitive cell to respond to the variations in the film record as confined to a minutely narrow portion thereof at any particular instant. Preferably this is accomplished without the aid of any lens system.

In making use of my invention, a light sensitive medium is utilized such as selenium or the like. It is well-known that the resistance of selenium varies with the intensity of light cast upon it. However, it is also a well-known fact that when such selenium cells are subjected to light intensities which vary at a rapid rate, the response of the selenium cell is not so great as for variations which take place at a less rate. Since audio frequency variations having a range extending between wide limits, say from one or two hundred vibrations per second up to the neighborhood of 10,000 per second or beyond, it has not been feasible in the past to cause uniform response of such selenium cells for all of the audio-frequencies desired to be reproduced. It is another object of my invention so to arrange matters that the response of a system utilizing such selenium cells is more uniform with respect to this audio-frequency range.

In accomplishing this result, it is to be borne in mind that as the record is moved past the cell, the cell should be subjected to illumination corresponding to a very narrow portion of the record in the direction of movement of the film. Instead of using a single narrow portion of the film at one time, I provide for a plurality of such narrow portions to affect the selenium cell at the same time; and by properly spacing these portions it is possible to reduce the degree of response to the low frequencies, whereby a more uniform response is obtained.

Accordingly, therefore, I provide a pair of separated tenuous light sensitive elements of selenium, which are parallel and extend across the sound track. The effect upon the amplifier system is due to the activity of both portions, and can be reduced by an opposition of the two effects. This reduction is greatest at a definite low frequency, depending on the rate of the movement of the film and the separation of the tenuous portions of the photoelectric cell.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a diagrammatic view of the system embodying my invention, the tenuous portions of the cell being greatly exaggerated in width for the sake of clarity; and Fig. 2 is a greatly enlarged sectional view taken along plane 2—2 of Fig. 1.

In Fig. 1 there is shown a loud speaker or other translating device 11, which serves to translate the electrical impulses into sound waves in any well understood manner. These electrical impulses can be first amplified by an amplifier system 12, to which minute impulses are fed, in a manner to be hereinafter described, and especially by the aid of a light sensitive cell shown in detail in Fig. 2.

The record film 13 is indicated as carrying a saw tooth record or sound track 14, although other types of photographic sound records could be used. This film 13 can carry a succession of frames of a motion picture such as indicated at 15. It is of course to be understood that this record 13 is moved at a uniform rate, of about 90 feet per minute, past a light sensitive cell structure.

This light sensitive cell structure can be in general supported on a transparent plate 16 as of glass. On this transparent plate structure there are deposited two extremely thin lines or areas 17 and 18 of selenium or equivalent material. In order to provide this tenuous line of selenium, the glass 16 can first be coated with a conducting layer 19 and then this layer can be removed at two places to provide a space in which the selenium material 17 and 18 can be placed. The selenium material can be applied as an overlying layer 20. For a standard width film of about 35 millimeters, the separation of the selenium lines 17 and 18 can be of the order of $\frac{3}{16}$ inch and the width of each line should be not greater than .001 inch while its length can conform of course with the width of the sound track 14, or about .080 inch. For amateur film of 16 millimeters, the width of the selenium elements 17 and 18 can be .0004 inch or less, and the length corresponds to about $\frac{3}{32}$nd of an inch.

Fig. 2 shows the record film 13 spaced slightly away from the back of the glass support 16, the source of light 22 being a substantial distance below the film 13 so as to transmit light through both the sound track 14 and the glass plate 16 on to the elements 17 and 18. This source is shown in Fig. 2 relatively closer than in actual practice, in order to reduce the size of the figure. However, in actual practice the film 13 can approach still more closely to the glass 16 or in fact film 13 can be placed on the same side of the glass plate 16 as the elements 17 and 18. It has been found that accurate response can be obtained even when film 13 is placed as far as one quarter of an inch from the glass plate 16, with ordinary separation of the source of light 22 from the record.

It is apparent that the photoelectric cell structure is very simple and inexpensive. It can be kept protected as by a glass cover 21 which is shown diagrammatically in Fig. 1 and in greater detail in Fig. 2.

At any particular instant the source of light 22 (Fig. 2) will affect both of the tenuous elements 17 and 18. The material 20 being of high resistance, its connection to both lines 17 and 18 has no material effect on the independent operation of these lines.

The tenuous elements 17 and 18 are made use of in a manner rendered clear in the diagram of Fig. 1. The element 17, for example, is in circuit with a coil 23, and a source of electrical energy 24. This is accomplished by connections 25 and 26 which lead respectively to terminal extensions 27 and 28 of the conducting layer 19. Similarly, element 18 is in series relationship with a coil 29 and the source 24 by the aid of the connections 26 and 30.

Coils 23 and 29 are arranged in such relationship as to form jointly the primary of a transformer 31, the secondary 32 of which transfers impulses to the amplifier system 12. The variations in resistance across the width of each of the elements 17 and 18 affect the current flow in coils 23 and 29 respectively. The coils are connected in such relationship that when like light impulses fall on each element 17, 18, simultaneously, these coils carry currents which have a neutralizing effect and consequently secondary 32 has little induced potential across it. This opposition effect is most effective at about 96 cycles which corresponds to a separation of $\frac{3}{16}$ of an inch for film travel of 90 feet per minute. At higher frequencies the relation of the phases of the currents in coils 23 and 29 is not in opposition to such an extent as for the low frequencies, and consequently only the lower frequencies are attenuated.

It is to be noted that no lenses are needed for the light system. This is due to the fact that the film record 13 is comparatively closely spaced to the line cells 17 and 18, and since these line cells are very narrow the response of the light sensitive system is confined at any instant to a narrow elemental portion of the sound track 14.

I have also found that the separation of the cell into two parts seems to lend clarity to the tones produced; although the exact reason for this is not clear.

I claim:

1. In a system for reproducing sound, a plurality of parallel spaced tenuous selenium elements, and means for successively varying the illumination of said elements in accordance with a common sound record.

2. The combination as set forth in claim 1, with the addition of an electroresponsive device for each element, these devices being connected to be in opposed relation.

3. In a system for reproducing sound from a moving medium having a sound track carrying a single record and arranged to vary the intensity of light transmitted to the system, a pair of parallel tenuous selenium elements extending across the sound track and spaced in the direction of travel of the medium, and a circuit for each element.

4. The combination as set forth in claim 3, in which the circuits are opposed for like effects in the two elements.

5. In a system for reproducing sound, a pair of parallel spaced tenuous selenium elements, means for simultaneously affecting said elements with a common sound record but from successive portions of the record, and means whereby the combined response of said elements is more attenuated for the low range of frequencies of the record than for the high range.

6. In a system for reproducing sound, a pair of parallel spaced tenuous selenium elements, means for simultaneously affecting said elements with a common sound record but from successive portions of the record, and means whereby the combined response of said elements is more attenuated for the low range of frequencies of the record than for the high range, comprising a pair of circuits, respectively connected in series to the elements, which circuits are opposed electromagnetically.

7. The process of reproducing sound from a sound track which comprises simultaneously affecting a pair of spaced parallel tenuous light sensitive elements by light in accordance with the sound track record, and opposing the effects of the light on the elements.

8. In a system for reproducing sound, a pair of tenuous, parallel, and closely spaced light-sensitive devices, a single source of constant light, a sound track capable of being moved between said devices and said source in a direction normal to the lengths of said devices, and a circuit connected with said devices for attenuating low frequency responses of said devices more than higher frequency responses.

9. In a system for reproducing sound, a single source of light, a sound track capable of being moved past said source and capable of transmitting light in varying amounts, a pair of tenuous, parallel, and closely spaced light sensitive devices separated in the direction of motion of said sound track and positioned on the opposite side of said sound track from said light source, and electromagnetically opposed circuits respectively connecting each device, for attenuating lower frequencies more than higher frequencies.

10. In a responsive circuit, a pair of closely spaced, tenuous, parallel light sensitive devices connected in series electrically, an electromagnet responsive device connected in series with said light sensitive devices and forming a closed circuit, said electromagnetic responsive device having a neutral tap, and a common source of current connected across said tap and a point electrically between said light sensitive devices, a single source of light, a sound track moving between said light source and said light sensitive devices, the light of said light source shining directly upon said sound track and the varying light transmitted by said sound track falling directly upon said light sensitive devices, and frequencies recorded on said sound track causing responsive electromagnetic frequencies in said electromagnetic responsive device by means of said light sensitive devices and said source of current, the distance between said light sensitive devices acting to cause more attenuation of lower frequencies than of higher frequencies in said electromagnetic responsive device, substantially as set forth.

11. In sound reproducing device, a support, a layer of conducting material deposited on said support and having discontinuations, the discontinuations being in the form of two or more parallel, tenuous strips, and a light sensitive material deposited on said support and in said discontinuations.

12. In sound reproducing device, a support, a layer of conducting material deposited on said support and having discontinuations, the discontinuations being in the form of two or more parallel, tenuous strips, and a continuous layer of light sensitive material deposited on said conducting material and said support.

13. In a system for reproducing sound of the class wherein a member having a single sound track is moved in a direction parallel to the length of the track past a source of light to permit the light to pass through successive parts of the track, a light sensitive system adapted to be placed so that the light transmitted through the record affects said system, comprising a pair of tenuous, parallel light sensitive devices separated in the direction of travel of the member.

14. In a system for reproducing sound of the class wherein a member having a single sound track is moved in a direction parallel to the length of the track past a source of light to permit the light to pass through successive parts of the track, a light sensitive system adapted to be placed so that the light transmitted through the record affects said system, comprising a pair of tenuous, parallel light sensitive devices separated in the direction of travel of the member, and a circuit connecting said devices, the spacing of the devices being such that at a definite frequency the circuit is oppositely affected by the devices, for attenuating frequencies neighboring said definite frequency.

JOHN H. ROUSE.